United States Patent
Knowles

(10) Patent No.: US 9,935,998 B2
(45) Date of Patent: *Apr. 3, 2018

(54) DIGITAL MESSAGE PROCESSING SYSTEM

(71) Applicant: FO2GO LLC, New Castle, DE (US)

(72) Inventor: Andrew Thomas Knowles, Raleigh, NC (US)

(73) Assignee: FO2GO LLC, New Castle, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/673,741

(22) Filed: Aug. 10, 2017

(65) Prior Publication Data

US 2017/0339212 A1    Nov. 23, 2017

Related U.S. Application Data

(63) Continuation of application No. 11/668,465, filed on Jan. 29, 2007, which is a continuation of application No. 09/324,249, filed on Jun. 2, 1999, now Pat. No. 7,173,651.

(51) Int. Cl.
    *H04L 29/08*    (2006.01)
    *H04L 12/58*    (2006.01)

(52) U.S. Cl.
    CPC .............. *H04L 67/04* (2013.01); *H04L 51/38* (2013.01); *H04L 67/06* (2013.01)

(58) Field of Classification Search
    CPC ......... H04L 67/04; H04L 51/38; H04L 67/06; H04L 12/5895
    See application file for complete search history.

(56) References Cited

U.S. PATENT DOCUMENTS

| | | |
|---|---|---|
| 4,884,132 A | 11/1989 | Morris et al. |
| 5,436,960 A | 7/1995 | Campana, Jr. et al. |
| 5,557,663 A | 9/1996 | Huang et al. |
| 5,606,365 A | 2/1997 | Maurinus et al. |
| 5,633,678 A | 5/1997 | Parulski et al. |
| 5,666,159 A | 9/1997 | Parulski et al. |
| 5,689,642 A | 11/1997 | Harkins et al. |
| 5,712,679 A | 1/1998 | Coles |
| 5,726,660 A | 3/1998 | Purdy et al. |

(Continued)

FOREIGN PATENT DOCUMENTS

WO    9728518 A1    8/1997

*Primary Examiner* — Luong T Nguyen
(74) *Attorney, Agent, or Firm* — Kirby B. Drake; Klemchuk LLP

(57) ABSTRACT

A wireless apparatus and system automatically processes digital "messages" to a remote system at a predefined destination address. Initial transmission occurs via a wireless network, and the apparatus process allows the simultaneous capture of new messages while transmissions are occurring. The destination address may correspond to an e-mail account, or may correspond to a remote server from which the message can be efficiently processed and/or further distributed. In the latter case, data packaged with the digital message is used to control processing of the message at the server, based on a combination of pre-defined system and user options. Secured Internet access to the server allows flexible user access to system parameters for configuration of message handling and distribution options, including the option to build named distribution lists that are downloaded to the wireless apparatus.

5 Claims, 18 Drawing Sheets

(56) References Cited

U.S. PATENT DOCUMENTS

| | | | |
|---|---|---|---|
| 5,737,491 | A | 4/1998 | Allen et al. |
| 5,742,763 | A | 4/1998 | Jones |
| 5,745,167 | A | 4/1998 | Kageyu et al. |
| 5,760,916 | A | 6/1998 | Dellert et al. |
| 5,760,917 | A | 6/1998 | Sheridan |
| 5,768,633 | A | 6/1998 | Allen et al. |
| 5,806,005 | A | 9/1998 | Hull et al. |
| 5,852,722 | A | 12/1998 | Hamilton |
| 5,861,918 | A | 1/1999 | Anderson et al. |
| 5,862,346 | A * | 1/1999 | Kley .................. G06Q 10/10 709/200 |
| 5,917,542 | A | 6/1999 | Moghadam et al. |
| 5,966,446 | A | 10/1999 | Davis |
| 5,974,401 | A | 10/1999 | Enomoto et al. |
| 5,987,508 | A | 11/1999 | Agraharam et al. |
| 5,991,290 | A | 11/1999 | Malik |
| 6,006,039 | A | 12/1999 | Steinberg et al. |
| 6,014,689 | A | 1/2000 | Budge et al. |
| 6,018,774 | A | 1/2000 | Mayle et al. |
| 6,023,345 | A | 2/2000 | Bloomfield |
| 6,035,323 | A * | 3/2000 | Narayen ........... G06F 17/30893 709/201 |
| 6,037,991 | A | 3/2000 | Thro et al. |
| 6,038,295 | A | 3/2000 | Mattes |
| 6,104,430 | A | 8/2000 | Fukuoka |
| 6,134,432 | A | 10/2000 | Holmes et al. |
| 6,166,729 | A | 12/2000 | Acosta et al. |
| 6,167,283 | A | 12/2000 | Korpela et al. |
| 6,167,469 | A | 12/2000 | Safai et al. |
| 6,181,373 | B1 | 1/2001 | Coles |
| 6,181,954 | B1 | 1/2001 | Monroe et al. |
| 6,226,412 | B1 | 5/2001 | Schwab |
| 6,240,445 | B1 | 5/2001 | Kumar et al. |
| 6,292,185 | B1 | 9/2001 | Ko et al. |
| 6,295,082 | B1 | 9/2001 | Dowdy et al. |
| 6,396,537 | B1 | 5/2002 | Squilla et al. |
| 6,427,078 | B1 | 7/2002 | Wilska et al. |
| 6,549,950 | B2 | 4/2003 | Lytle et al. |
| 6,642,959 | B1 | 11/2003 | Arai |
| 6,657,702 | B1 | 12/2003 | Chui et al. |
| 6,715,003 | B1 | 3/2004 | Safai |
| 6,784,924 | B2 * | 8/2004 | Ward .................. H04N 1/00132 348/207.1 |
| 6,833,861 | B2 | 12/2004 | Matsumoto et al. |
| 6,877,031 | B2 | 4/2005 | Watanabe et al. |
| 6,930,709 | B1 | 8/2005 | Creamer et al. |
| 7,173,651 | B1 * | 2/2007 | Knowles ............ H04N 1/00212 348/207.1 |
| 2001/0022618 | A1 | 9/2001 | Ward et al. |
| 2001/0029178 | A1 | 10/2001 | Criss et al. |
| 2002/0057340 | A1 | 5/2002 | Fernandez et al. |
| 2002/0122061 | A1 | 9/2002 | Martin, Jr. et al. |
| 2002/0167595 | A1 | 11/2002 | Patel et al. |
| 2003/0025808 | A1 | 2/2003 | Parulski et al. |
| 2003/0142215 | A1 | 7/2003 | Ward et al. |

* cited by examiner

Edit/View Address Book Entry

Save

Entry Name: Jeff Smith

| First name | Jeff |
| Last name | Smith |
| Nickname | jeff |
| e-mail | jsmith@aol.com |
| Reply OK (Y/N) | N |
| e-mail2 | |
| Reply OK (Y/N) | N |
| Work Phone | 919.888.8888 |
| Home Phone | |
| Fax Number | |
| Mobile Phone | |
| Path | Z:\images\epic\ |
| Mailing Address | |
| Address2 | |
| City | |
| Zip | |
| Birthday | |

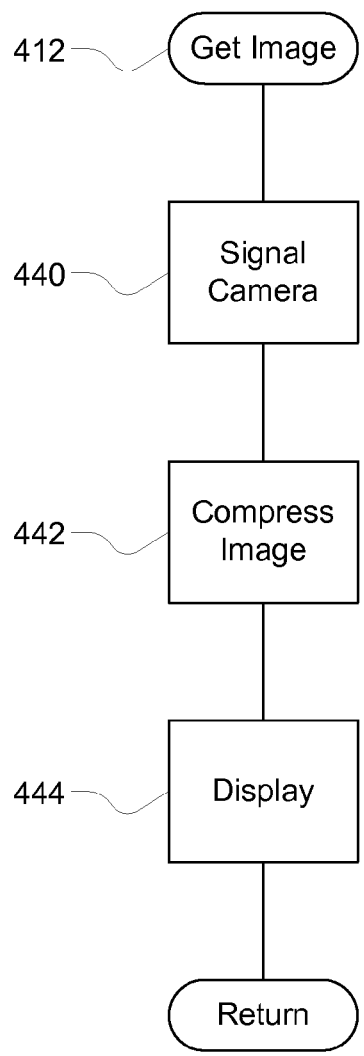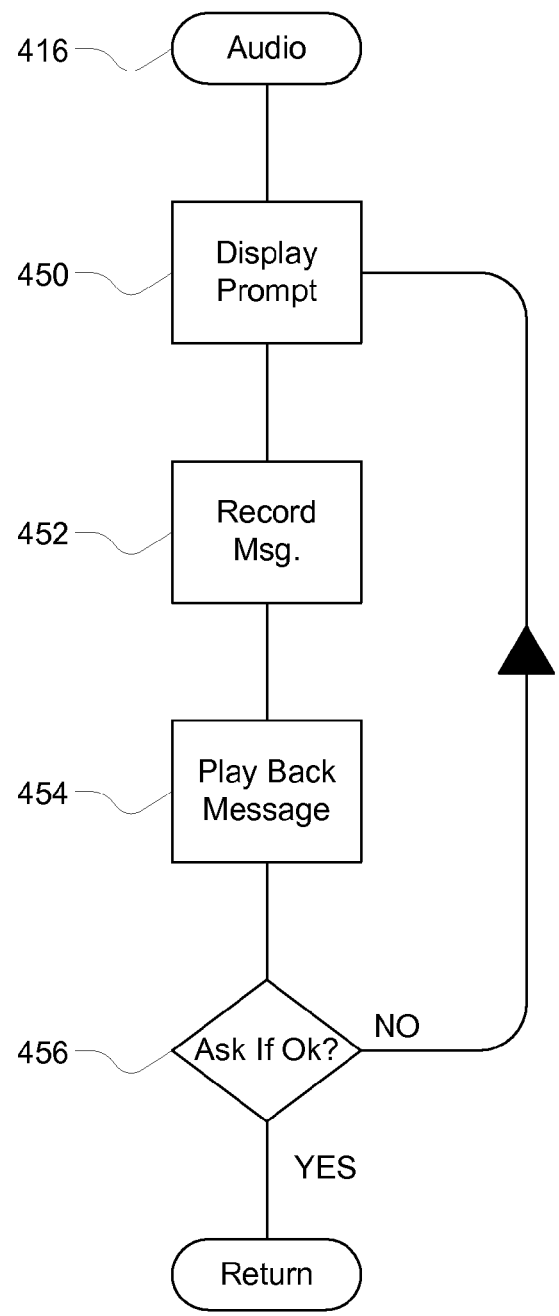
FIG. 14
FIG. 15

DIGITAL MESSAGE PROCESSING SYSTEM

CROSS REFERENCE TO RELATED APPLICATIONS

This Application is a continuation of application Ser. No. 11/668,465 filed Jan. 29, 2007 entitled "Digital Message Processing System" which is a continuation of application Ser. No. 09/324,249 filed on Jun. 2, 1999, entitled "Apparatus and System for Prompt Digital Photo Delivery and Archival," the disclosures of which are herein incorporated in their entirety.

FIELD OF THE DISCLOSURE

The present disclosure relates to digital cameras and particularly to digital cameras which include a radio frequency (RF) transceiver for transmitting digital photos to a remote destination according to user preferences.

BACKGROUND

Digital cameras are increasingly popular, and the popularity is due in part to their elimination of processing delays involved with conventional film-based photography. With a digital camera, one does not have to shoot an entire roll of film and send it to a processor for development before seeing the resulting photograph. Instead, one can immediately download a digital image to a computer and display the photograph, or in some instances link the digital camera to a TV monitor to display the photograph. Another attractive feature of digital cameras is that the digital images they create, after being stored on a computer, can be forwarded to others via e-mail or can be incorporated into other electronic documents, including Internet web pages.

However, the process of connecting the digital camera to a computer and then downloading images to the computer for storage and viewing can be complicated. Some digital camera manufacturers have attempted to make this process easier by including in the camera a standard format 3.5-inch floppy disk drive for storing digital images so that the images can be easily accessed by computers with similar disk drives. Others provide flash card memory which can store a high number of images, or provide an infrared (IR) port for transferring images to a computer.

Even with these features, the image transfer cannot be begun until the digital camera (or storage device) is physically connected to a computer, or in the case of digital cameras and computers which include IR transceivers these must be in close proximity before a transfer can be made. For many users, this process is confusing and detracts from the usefulness of the device. When a user wishes to view or share access to a digital photo quickly, this delay and manual transfer process can be both inconvenient and frustrating.

Another potential problem with current digital cameras is that they generally require creation of a database of images on a home or office computer, which often has limited accessibility, is unsecured, and is infrequently backed up. With the growing popularity of Internet accessible software programs, and "network computers" which include little or no data storage, there is a need for a networked image storage and archival service that provides secure, reliable, and universally accessible image storage services. Such a service would allow shared access to and transfer of images by family or business groups in a format which would greatly enhance the ability to categorize and sort each image by time, date, and occasion, and which would at the same time greatly reduce the possibility of losing important images. The Fujifilm company is known to offer an Internet archival service in connection with conventional film processing, but there is no known similar service for digital photos.

When compressed, a color digital image is typically 10K bytes or more in size, and transmission of such an image requires from 10 to more than 30 seconds, depending on wireless modem transmission rates. Cellular service providers typically charge for total circuit connection time or, in the case of wireless data services providers, for the amount of data transferred, and it is therefore advantageous to reduce the required connection time to perform a file transfer or the amount of data to be transferred. One way to do this is to compress the file before transmission. But even when a file is to be sent to multiple recipients one would not want to initiate multiple calls in order to transfer the file to each recipient, even if the file is compressed. It would be beneficial to have a system which allowed one to forward an image file, with distribution instructions, to a central repository, and know that the repository would then save and/or automatically distribute the image file according to prior user instructions, without incurring another expensive wireless transfer.

Digital cameras which include the ability to effect a wireless RF image transfer are not known to be currently marketed in the United States. A search of issued U.S. patents has revealed U.S. Pat. No. 4,884,132 to Morris et al, which provides a "personal security unit" which includes a digital image sensor, a cellular transmitter, a window aligned with the image sensor, and which transmits digital information identifying the hand-held unit to a remote cellular receiving station where all cellular communications received from the personal security units are recorded. Morris states that the recorded data can be accessed at a later time if a crime is reported.

Another known device is disclosed in U.S. Pat. No. 5,712,679 to Coles which discloses a security system with a method for locatable portable electronic camera image transmission to a remote receiver. This device provides the means to transmit a video image along with device identifying information and position coordinate information to a remote receiver. Coles states that the transmission may be accomplished by cellular radio and is received by a remote receiver where the image may be displayed or printed by facsimile.

SUMMARY

Embodiments of the present disclosure may provide a wireless digital camera device (also referred to herein as a wireless device) including a processor, RF communications device (modem), memory, and digital camera which is configured to transmit a digital data message, including at least a digital image, an account ID, and a recipient code, across a combined wireless and wired network to a host system at a predefined Internet Protocol (IP) address. The portable apparatus is programmed to minimize the number of user inputs required for operation in order to operate much like other automatic cameras, providing "aim and shoot" operation. While it is presently possible to assemble a portable device which can transfer data files, including image files, to a destination computer by using readily available commercial products, such as a portable computer, camera, and cellular modem, such a system requires user input to configure and initialize, including a destination phone number for modem dialing or a host IP or e-mail address to send the image to. The present disclosure provides a simple wireless photo delivery system which requires minimal user inputs for successful configuration and operation.

In order to simplify the wireless camera apparatus set up and operation, the present disclosure provides a user-friendly means to customize operational features of the camera. Many computer users today have access to web sites on the Internet, and are familiar with the process of interacting with programs and forms posted on Internet web sites. In one embodiment of the present invention, a digital camera service server provides a means for users to define distribution nicknames and custom operation options, and automatically downloads these custom operational parameters to the wireless camera whenever they are updated.

In order for an e-mail system to resolve e-mail addresses into IP addresses, it is necessary for a user device to have access to a domain name server (DNS) resolver. This exchange of messages between the remote device and the DNS at time of message delivery is eliminated in one embodiment of the present invention by having e-mail addresses resolved into their corresponding IP addresses by the digital camera service server (subsequently referred to herein as the server) prior to downloading these IP addresses with address nicknames to the wireless camera device. This enables embodiments of the wireless camera device which contain a wireless packet data communications device such as a Cellular Digital Packet Data (CDPD) modem to construct and send messages directly to the intended recipient's known IP address in a protocol format known to those of ordinary skill in the art, such as TCP, Simple Mail Transfer Protocol (SMTP), Internet Message Access Protocol (IMAP), Multipurpose Internet Mail Extensions (MIME), Serial Line Internet Protocol (SLIP), Point to Point (PPP), or Post Office Protocol (POP) without reference to a DNS resolver.

Wireless device users may wish to maintain control over who can send messages to them, in order to avoid paying for unwanted message transmissions. Another aspect of the present invention allows messages generated by the wireless device to be formatted so that the message origin address appears as a server address. This causes all message replies to be routed to the server, which receives and filters all replies addressed to the wireless device and only forwards messages which are from approved sources and in appropriate formats to the wireless device.

There is then a need to provide an apparatus and system which will allow for effortless transfer of a message including a digital image, an account identifier, and an optional recipient code, across a combined wireless/wired network to a host device at a pre-defined IP address. One aspect of the present disclosure provides a digital camera service server host device at the pre-defined IP address which can store portions of the message, and/or forward select portions of the message and digital image to one or more recipients associated with a message recipient code.

In the case where the delivery IP address corresponds to a server, the data message may be stored at the server for later access or may be immediately forwarded to one or more IP addresses that correspond to a recipient code included in the data message. When an image is to be sent to multiple recipients, it is much more economical to only incur one transmission from the wireless camera device across the wireless communications link to the server, and then forward the image to each intended recipient through a conventional wire-line or fiber optic network.

In one embodiment of the present disclosure, an account is established on the server which corresponds to at least one wireless camera device. This server may be a private system accessible only via a private network, or may be connected to the Internet and be configured to allow wireless device users to access the server by using commonly available world wide web browsers. In either case the server is preferably remotely accessible in order to establish or update account parameters, or to access previously transmitted digital images and or responses thereto. In the preferred system, each server account is password protected for access only by authorized users. Authorized users may update their server accounts to establish recipient codes, or nicknames, and associate these codes with one or more destination e-mail addresses, IP addresses, phone numbers (for delivery of audio messages), or storage destinations (such as a server path name), thereby creating nicknames for the purpose of controlling how messages will be archived and/or distributed to individuals or groups.

When certain account parameters, such as nicknames, are changed on the server, they are automatically flagged to be downloaded in a list to the wireless camera device the next time the wireless device contacts the server. Alternately, the wireless device may be programmed to get a fresh copy of account parameters, or portions thereof, upon each new connection to the server. This nickname list is viewable in a scrollable window on the wireless camera device, providing a quick means for selecting who a particular data message is to be sent to, without concern for entering an e-mail or IP address.

For example, a camera user who is employed as a Realtor may define both business nicknames and personal nicknames. Business nicknames may include codes based on property attributes (a 3BR2BA code for all customers who are currently looking for a house with at least three bedrooms and two baths) or may include codes for different communities or property price ranges. Finance companies could also use the wireless camera to automatically create a photo of the collateral property, as required in many states, and simultaneously send the photo to the loan processor and to an archive file.

Other potential uses for the present disclosure include (i) photo-advertisements—for example, camera can be used by sales agents to send pictures to a list of current clients, to an office webmaster, print shops, etc., or to save photos in a pre-defined server directory; (ii) journalists could use the system to submit late breaking news pictures; (iii) insurance adjusters—photo with claim or file number can be mailed directly to the home office or saved in a pre-defined server directory associated with the file; (iv) police—photos of accident site/crime scene can be captured and archived; and (v) a holiday photo system where the camera can be rented while on vacation in order to have photos automatically e-mailed to a printing service, or to a list of friends/relatives with whom you want to share trip events.

In the preferred embodiment, the present disclosure comprises a battery-powered wireless camera device, including a digital camera for creating a digital image, a memory for storing digital images, a delivery IP address, and a list of nicknames, an RF communications device connected to the wireless device, and processor means for transmitting a message to the delivery IP address via the communications device. Backup memory in the form of a removable disk or memory card may be provided in some embodiments for message storage with or without message transmission. The message includes an account ID, a recipient code (nickname), and at least one digital image created by the digital camera. As further described in the Detailed Description, in some embodiments, the message may include message origination date, time, a message classification indicator, digital audio recordings, and/or location coordinates, and in some instances, may not include a digital image.

The delivery IP address may be saved in the wireless camera device memory in response to input commands entered at a device user interface, input commands entered remotely via the communications device, or input commands during manufacture of the wireless device. The RF communications device may be a circuit-switched data modem or packet data modem, and may respectively establish a switched connection through the Public Switched Telephone Network (PSTN) to the server or to a host device and router system at a particular phone number from which messages are transmitted to the destination IP address, or may transmit the message directly through a cellular service provider digital packet network connection, such as CDPD, to the destination IP address through an Internet connection.

In alternate embodiments, the wireless camera includes a microphone interface for recording audio messages to be transmitted in a digital format with messages. In such embodiments where the interface includes a microphone, a voice recognition module may be used to translate spoken messages into operational commands. For example, the wireless apparatus may be activated to record a spoken nickname, address, or alphanumeric identifier for association with the message, process this recording with the voice recognition module, and then include the character output of the voice recognition module as a nickname, e-mail address, classification or message field in the next message transmission. Other interface means may include a bar code scanner, or numeric or alphanumeric keypad.

Another embodiment is configured to function as an enhanced digital phone that includes a digital camera. Other embodiments include an optional global positioning system (GPS) unit for capturing location data that may then be included in the message. Yet another embodiment of the present disclosure includes a data port which is connected directly to the communications device so that the wireless camera device can be used as a portable RF modem for external devices which are connected to the data port from time to time.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which:

FIG. 9 shows a server interface means display of representative individual recipient information;

FIG. 14 shows a process flow chart of the get image process of FIG. 12;

FIG. 15 shows a process flow chart of the audio recording process of FIG. 12;

DETAILED DESCRIPTION

Figure 1:
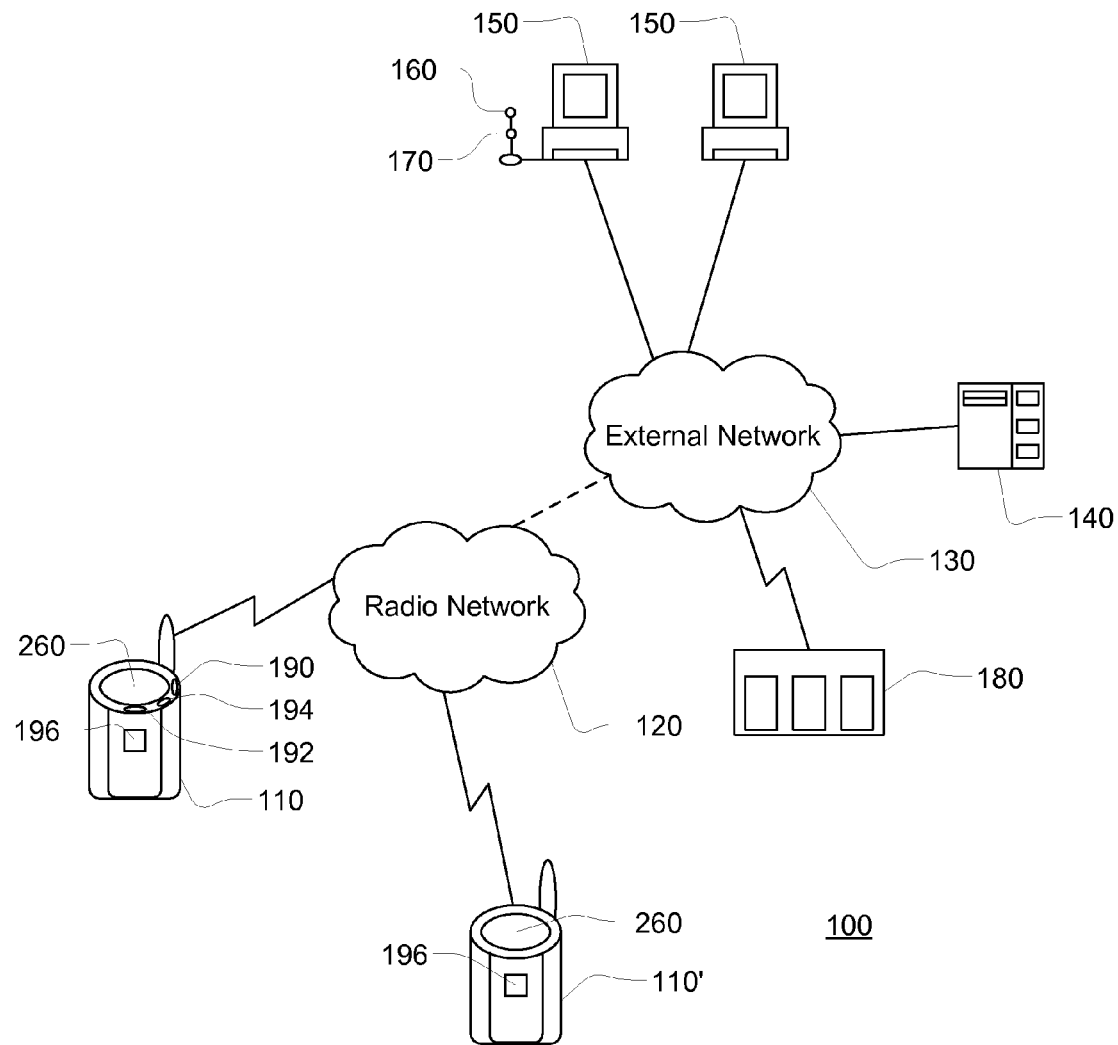
FIG. 1 is a high-level diagram of the photo delivery system of the present disclosure.

As will be understood from reading and understanding the following more detailed description, the present disclosure includes a wireless digital camera apparatus, and in the preferred embodiment includes the digital camera apparatus as part of a digital photo delivery system, which system also includes a server that is accessible through the Internet for user updates. Each user of such a system has an assigned server account ID and password which is required in order to update account parameters and access messages stored on the server although in some embodiments users may designate that certain images may be stored in a public area from which they may be freely accessed or linked to. Photo delivery system 100 is shown in FIG. 1 as including wireless camera apparatus 110, which transmits and receives messages via radio network 120. Radio network 120 can be any data-capable airlink (such as GSM, TDMA, CDMA), or wireless data network such as CDPD, or may be a short-range radio link such as an in-building network or a radio link between the wireless device and other devices via a standard protocol such as the Bluetooth Specification sponsored by Ericsson, IBM, Intel, Nokia, and Toshiba. Radio network 120 is connected to external network 130, which may be the Internet, an intranet, or other private data network. External network 130 is connected to at least one wireless camera service server 140, and one or more viewer stations 150 (which will ordinarily comprise a personal computer and may be configured to include viewer microphone 160 or viewer camera 170). In alternate embodiments, the external network is connected to printing service 180.

Figure 2:
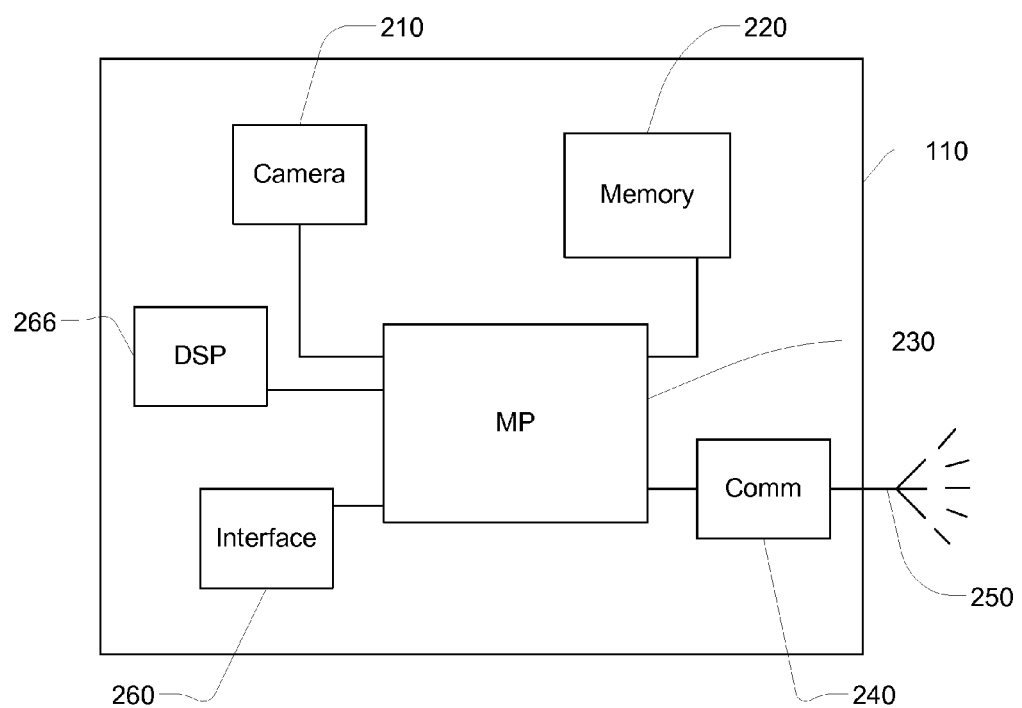
FIG. 2 is a block diagram of the wireless device.

Major elements of wireless camera apparatus 110 are shown in block form in FIG. 2, as including digital camera 210, memory 220, processor 230, RF modem 240 which includes antenna 250, interface means 260, and digital signal processor 266, which in the preferred embodiment are integrated into one unit. However, wireless camera device 110 and server 140 may be programmatically implemented by using many general-purpose hardware components. For example, wireless device 110 may be implemented with a handheld PC such as the Mobilon HC 4100 connected to a CE-AG04 color digital camera card, both available from Sharp Electronics Corporation, and a wireless CDPD modem such as the Sage modem available from Novatel Wireless, Inc. Alternately, the wireless device may be implemented by programming a Novatel Wireless CONTACT handheld PC (which includes an integrated CDPD modem), now available for beta testing from Novatel, and which is connected to any one of several digital cameras presently available on the market. The present disclosure may also be programmatically implemented on a combination of notebook computer running the Windows 95 operating system, wireless CDPD modem such as the PM100C CDPD modem from Motorola, and digital camera, such as the QuickCam VC from Connectix Corporation or the CMOS-PRO from Sound Vision Incorporated, or the Sony Vaio C1 Picturebook computer that incorporates a digital camera, and a CDPD PC card modem such as the Sierra Wireless Aircard.

Although the RF modem for the preferred embodiment is configured for packet data transmissions, circuit switched modems may be used without departing from the spirit of the present disclosure. For example, alternate embodiments may include a combined CDPD and circuit switched modem, such as the Sierra Wireless SB220 OEM communications module, in order to allow wireless communication via a circuit switched connection to server 140 when the wireless device is used in an area where CDPD service is not available.

Figure 3:
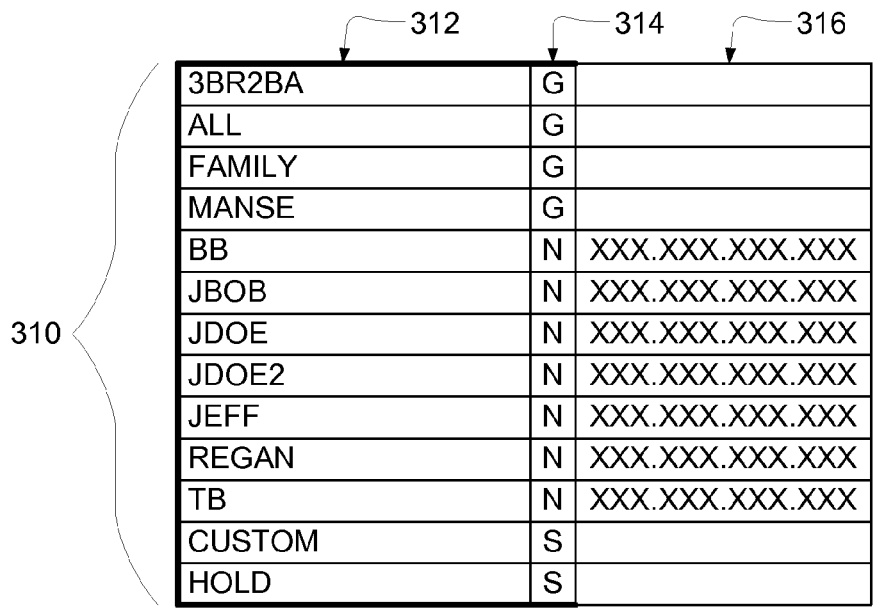
FIG. 3 shows a representative user configuration table for the wireless device.

FIG. 3 shows representative configuration table 310 for the wireless device which in the preferred embodiment system is built on server 140 and stored in server memory, and downloaded to wireless device memory 220 after each change to table contents, or upon initial activation of wireless device 110, although for wireless device embodiments with interface means 260 which provide the ability to input alphanumeric text, configuration table 310 or portions of it can be modified directly on wireless device 110. In FIG. 3, the items in recipient code column 312 are nicknames that may be selected by users of wireless device 110 in order to control distribution of messages transmitted from the wireless device. Optional recipient type column 314 represents an indication of whether the nickname designates a group nickname (G) an individual nickname (N) or a system processing code (S). Two system processing codes CUSTOM and HOLD are shown. HOLD is the default nickname that is used if no other nickname is selected. When the apparatus is activated to send a photo with HOLD, a message is constructed and sent to server 140 where it is held for predetermined period of time to await further processing instructions. When wireless device 110 is activated to send a photo with CUSTOM, a process is activated on wireless device 110 to allow the user to designate a custom e-mail address prior to transmitting the photo message to the server. Recipient IP address column 316 corresponds to IP address data which is generated by server 140 before downloading the table to wireless device 110, and which is applicable only when the nickname is for an individual. Although not shown here, preferred embodiment configuration table 310 also includes a list of message classifications as further described in reference to FIG. 6 below, as well as other custom parameters used to control operation of wireless device 110.

Figure 4:
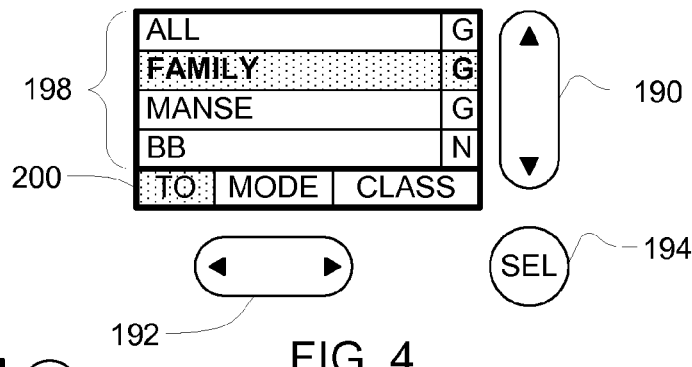
FIG. 4 shows a representative recipient selection view of the wireless device interface means.
Figure 5:
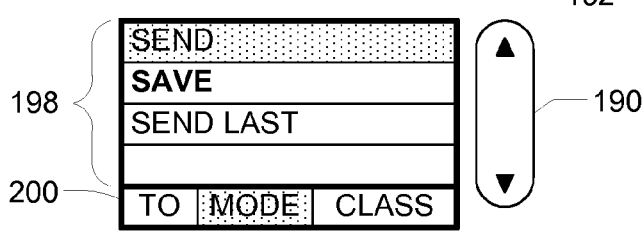
FIG. 5 shows a representative mode selection view of the wireless device interface means.
Figure 6:
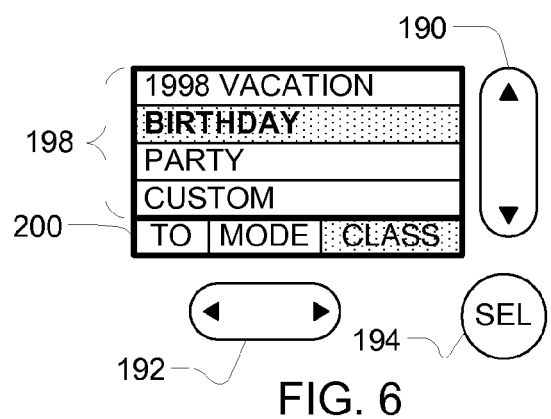
FIG. 6 shows a representative classification selection view of the wireless device interface means.

FIGS. 4-6 show a portion of preferred embodiment wireless device interface means 260 as including configuration display 198, mode display 200, vertical scroll key 190, horizontal scroll key 192, and select key 194. As will be apparent to one skilled in the art, configuration display 198 and mode display 200 may be comprised of an active matrix display, LCD display, or other appropriate display means. In other embodiments scroll keys 190 and 192, and select key 194, may be incorporated into a touch screen display.

Mode display 200 of the preferred embodiment includes three possible operation modes, "TO", "MODE", and "CLASS", which are selected by horizontal scroll key 192, and the currently selected operation mode is highlighted. When the TO mode is selected, preferred embodiment configuration display 198 shows up to four recipient codes and their corresponding recipient types from current configuration table 310. In FIG. 4, three group nicknames and one individual nickname are displayed, with the current selection ("FAMILY") being highlighted. Nickname selection in the preferred embodiment is controlled by vertical scroll key 190.

FIG. 5 shows that when the MODE operation mode view is selected on mode display 200, configuration display 198 shows a list of current operation modes for that embodiment of the wireless device. The display shown is for an embodiment that allows operation in a "SEND", "SAVE", and "SEND LAST" mode. For illustration purposes, the preferred embodiment, which allows the capability to record an audio message for transmission along with a digital photo image, would have operational modes of "SEND", "SEND W/AUDIO", "SAVE", "SAVE W/AUDIO", "SEND LAST" and "AUDIO ONLY", corresponding respectively to transmitting an image without an audio message, transmitting an image with an audio message, saving an image without transmitting it, saving an image and an audio message without transmitting, transmitting the last saved message, and transmitting only an audio message.

FIG. 6 shows that when the CLASS operation mode is selected on mode display 200, configuration display 198 shows a list of current message classifications, which may be selected by operation of vertical scroll key 190. When wireless device 110 is activated to send a message with the CUSTOM classification selected, a process is activated on wireless device 110 to allow the user to designate a custom message classification, such as a customer number or name, prior to transmitting the photo message to server 140. Various message classifications may be customized on server 140 of the preferred embodiment and downloaded to wireless device 110 along with other portions of configuration table 310 as will be later described in relation to FIG. 13.

Figure 7:
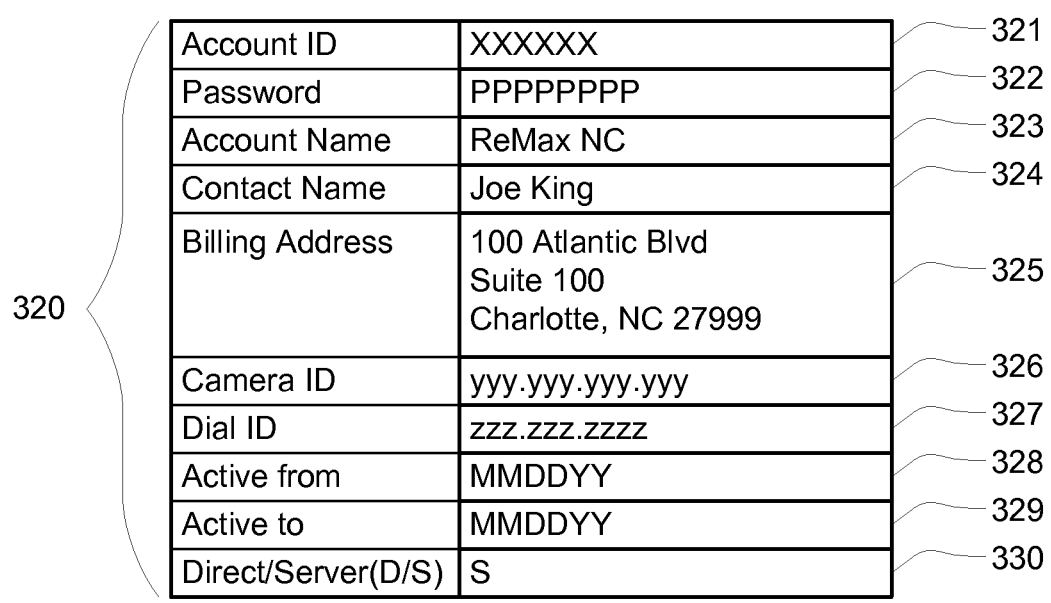
FIG. 7 shows a representative account configuration record on the server of the present disclosure.

FIG. 7 shows a representative account configuration record on server 140 of the present disclosure. In the preferred embodiment wireless photo delivery system, each wireless device user will have an account configuration record on the server which includes account ID 321, password 322, account name 323, contact name 324, billing address 325, camera id 326 which corresponds to RF modem 240 network equipment identifier or IP address (for those devices with a packet data modem), wireless device dial ID number 327 corresponding to the phone number associated with RF modem 240 (for those devices with a standard circuit switched cellular modem), and date fields 328 and 329 corresponding to the dates for which account service has been established. Other embodiments include Direct or Server switch field 330 that is used to indicate whether wireless device messages to individual nicknames will be transmitted first to the server for distribution or directly to the nicknames associated IP address. In such embodiments, only messages that are transmitted to the server can be archived.

Figure 8:
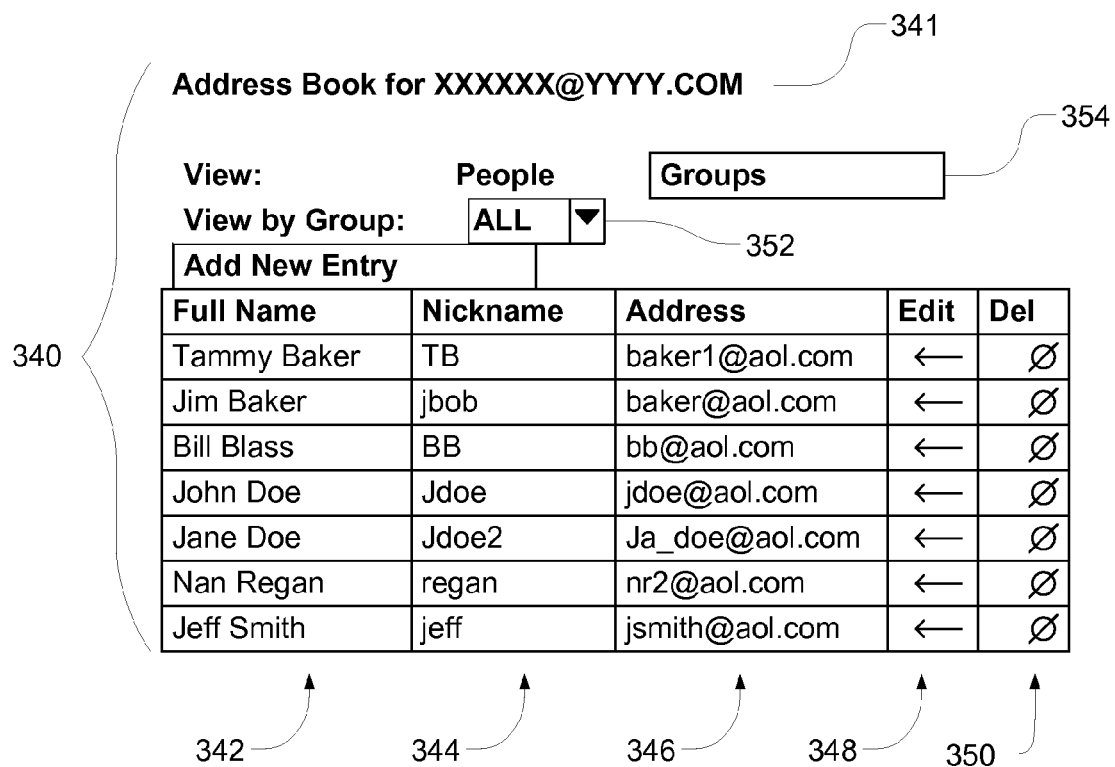
FIG. 8 shows a server interface means display of account recipient information.

FIGS. 8-11 depict server interface means displays in the preferred embodiment for establishing and maintaining account recipient information which are preferably accessible via any Internet browser program, and which are stored in server database tables, along with the FIG. 7 account configuration record, in any number of ways which will be apparent to those who are skilled in the relevant art using standard techniques such as active server pages accessing a relational database. FIG. 8 shows people or individual address screen 340 view of all account message recipients in column 342, associated nicknames in column 344, associated e-mail addresses in column 346, and edit and delete selector buttons in columns 348 and 350. Other user selection buttons in this screen view are drop-down list view selector 352 and group view selector button 354. The top of this display shows account e-mail address 341 that is associated with this server account. This address 341 in the preferred embodiment is comprised of the Account ID (represented here as XXXXXX), and the server domain name (represented here as YYYY.COM). In one embodiment, any e-mail messages that are received by the server for this e-mail address in an acceptable format from authorized e-mail addresses (as further described below) will be forwarded to the associated wireless device.

FIG. 9 shows server interface means display address book detail screen 360 of representative individual recipient information, corresponding to the last address book entry shown in FIG. 8, and indicating the allowed level of detailed information which is stored on server 140 for each account individual recipient record in the preferred embodiment. Most of these fields are self-describing, but e-mail reply OK indicators 362 and 364 are used by one embodiment server to build an account table of all e-mail addresses where this indicator is set to Y. This table is checked when the server receives e-mail addressed to the account e-mail address, and if the sender's e-mail address is found in the table then the e-mail will be forwarded in an appropriate format to the wireless device. Phone numbers 366 are optional, but are included for embodiments that are capable of forwarding wireless device messages that include an audio portion to a telephone or voice mail number, which can be accomplished in many ways apparent to those skilled in the relevant art. Path 367 is optional and is included for embodiments where the message is to be saved under a specific server directory path in lieu of or in addition to being distributed.

Figure 10:
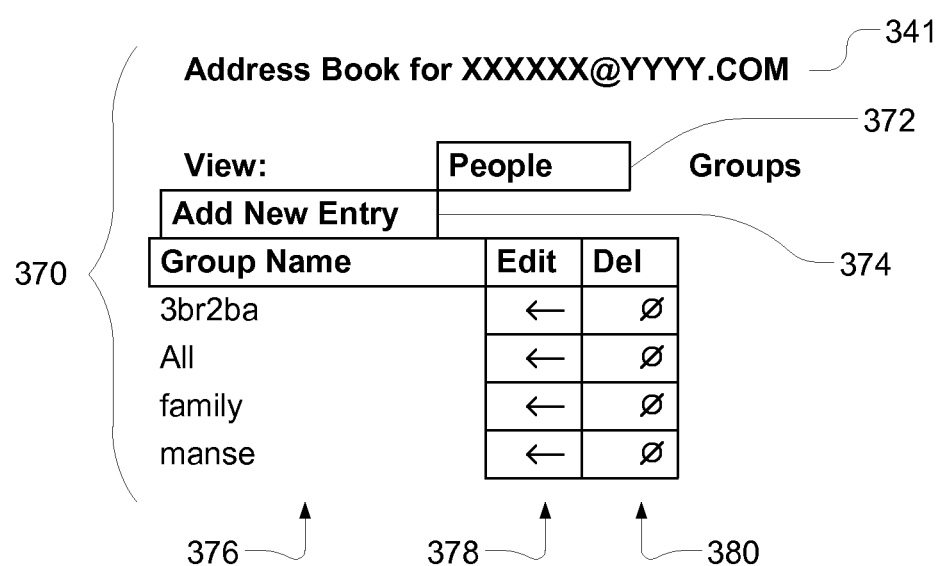
FIG. 10 shows a server interface means display of representative group information.

FIG. 10 shows server 140 interface means group view display 370 of representative group information that is accessed in the preferred embodiment by selecting group view selector button 354 shown in FIG. 8. This group view display 370 shows currently defined account groups and includes people view selector button 372, add new entry selector button 374, group names display column 376, edit selector button column 378 for each group name, and delete selector button column 380. Selection of people view button 372 will take you back to the view of FIG. 8, and selection of add new entry selector button 374 or any edit selector button in column 378 will take you to the group detail view of FIG. 11.

Figure 11:
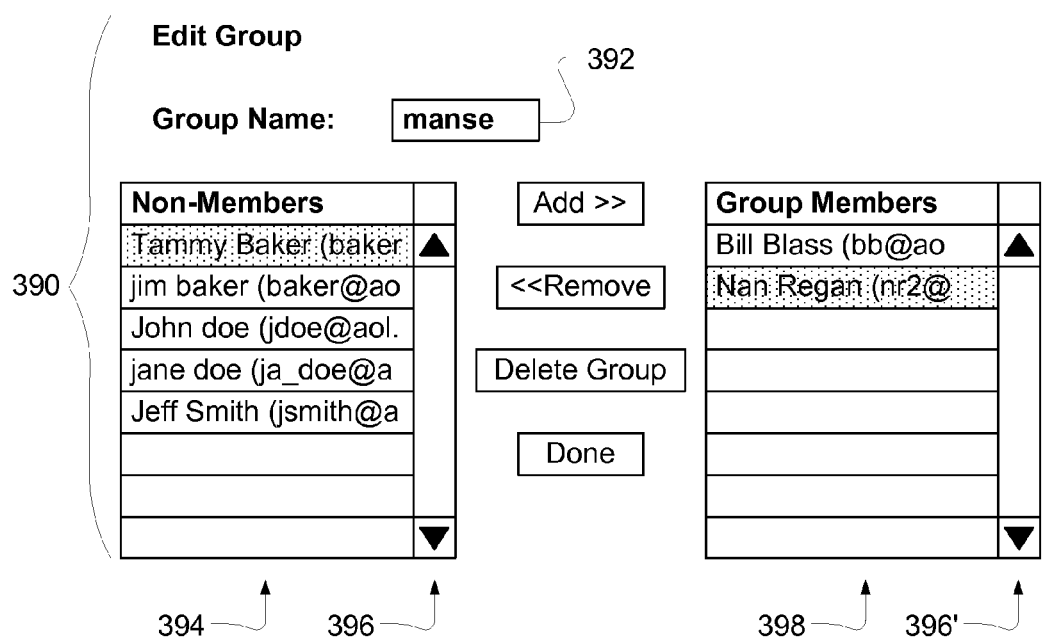
FIG. 11 shows a server interface means display for editing representative group information.

Server 140 interface means group detail view display 390 for editing representative group information in the preferred embodiment is shown in FIG. 11. This particular group detail view shows hypothetical entries for a group name "MANSE" in group name selector field 392. When detail view 390 is activated by add new entry selector button 374 of FIG. 10, the group name selector field would be blank, and all defined individuals would be displayed in non-member display column 394. Preferred group detail view 390 includes vertical scroll bars 396 and 396' and group member display column 398. Other user selectable buttons on the preferred group detail view include add, remove, delete, and done buttons, which operate respectively to add highlighted non-members shown in column 394 to the group, to remove highlighted members shown in column 398 from the group, to delete the entire group, or to return to the group view display 370 of FIG. 10 after processing any changes.

Figure 12:
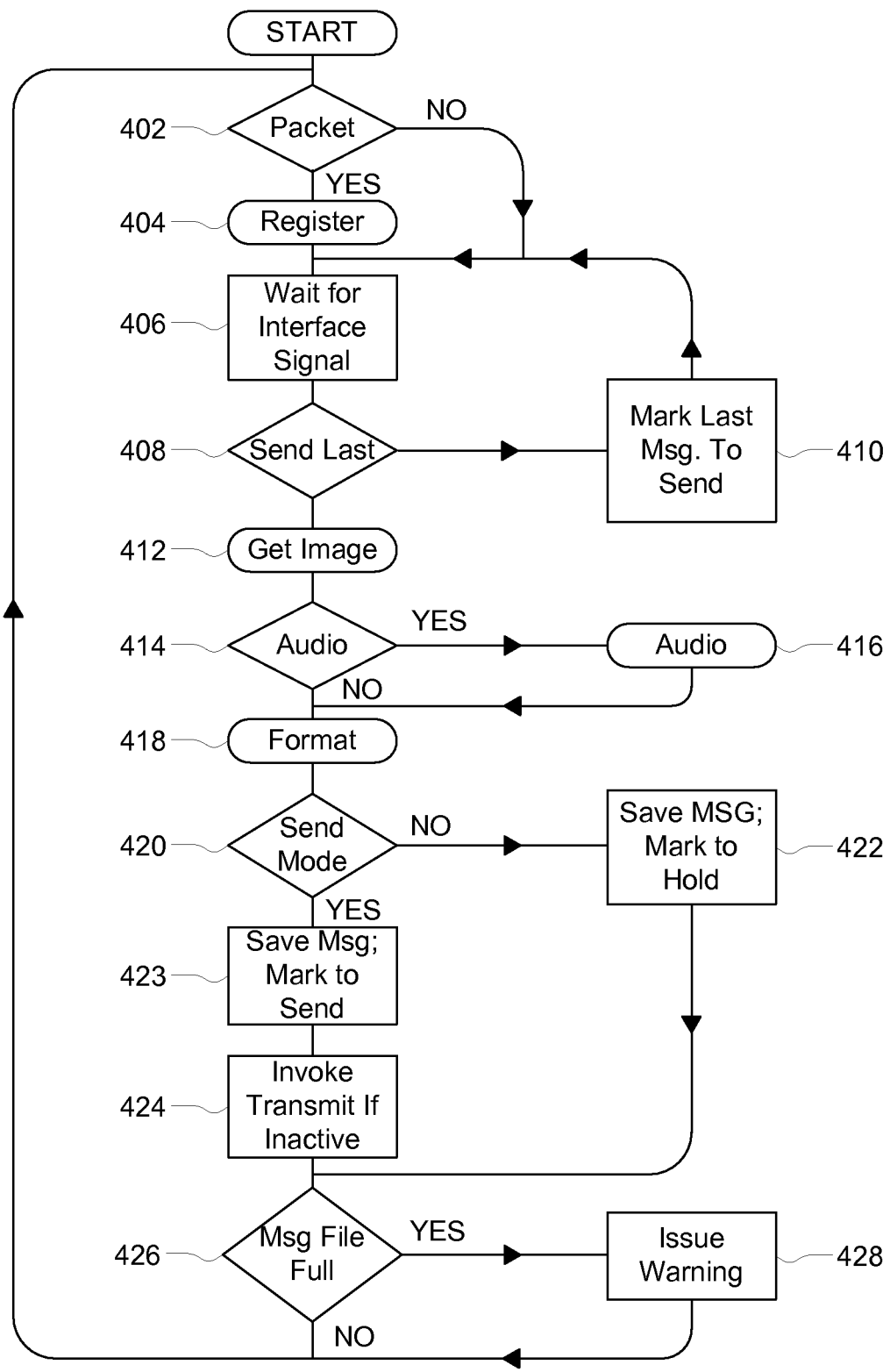
FIG. 12 shows a process flow chart for one embodiment of the wireless camera device of the present disclosure.
Figure 18:
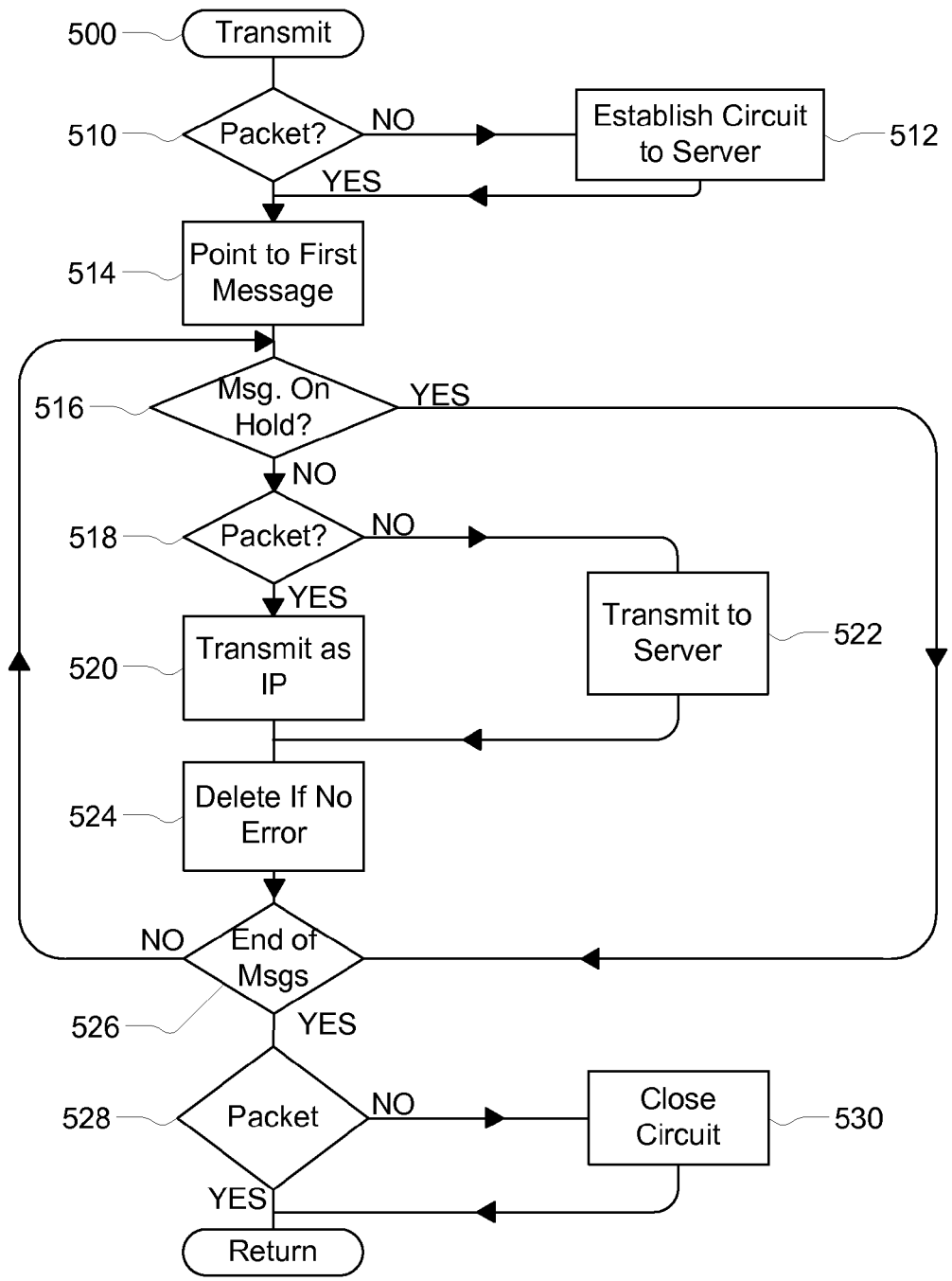
FIG. 18 shows a process flow chart of the transmit process of the preferred embodiment wireless camera device.

FIG. 12 shows the overall method used to operate one embodiment of the wireless camera device of the present invention that includes both switched circuit cellular and wireless packet data modem capabilities. The process begins at block 402 where a flag is checked to determine whether the wireless packet data modem is to be used. If so, processing continues with the registration process of block 404, which is shown in further detail in FIG. 13. In the alternative, the registration process is skipped and (although not shown here) wireless devices with circuit switched modems may contact server 140 to obtain fresh configuration table 310 before processing continues at block 406, where processing halts until a signal is received indicating send key 196 has been activated. At block 408, the operation mode is checked, and if the SEND LAST switch is set, processing branches to block 410 where the first previously held message is marked to be sent, after which processing returns to a wait state at block 406. If the send last flag is not set, and the operation mode is not AUDIO ONLY, the GET IMAGE routine of FIG. 14 is activated at block 412. If at block 414 the AUDIO ONLY, SAVE W/AUDIO, or SEND W/AUDIO operation mode is set, the AUDIO routine of FIG. 15 is activated at block 416 before activating the FORMAT routine of FIG. 16 at block 418. If at block 420 the operation mode is set to SAVE or SAVE W/AUDIO, processing branches to block 422 where the formatted message is saved in memory 220 and marked to be held in the wireless device memory, but if the operation mode is not set to save the message, then at block 423 the message is saved in memory 220 and marked to be sent as soon as possible, and at block 424 the Transmit function of FIG. 18 is invoked, if this is not already active. In either case processing continues at block 426 where if memory is full, a warning is issued to the operator via user interface means 260 which, in those embodiments that have flash memory or other removable memory devices, would prompt the user to replace memory device 220, before branching back to the beginning of the method at block 400. While this describes the best mode embodiment process, it will be apparent to those skilled in the art that many steps may be executed in an altered order or may be otherwise modified without departing from the scope of the present disclosure as claimed herein.

Figure 13:
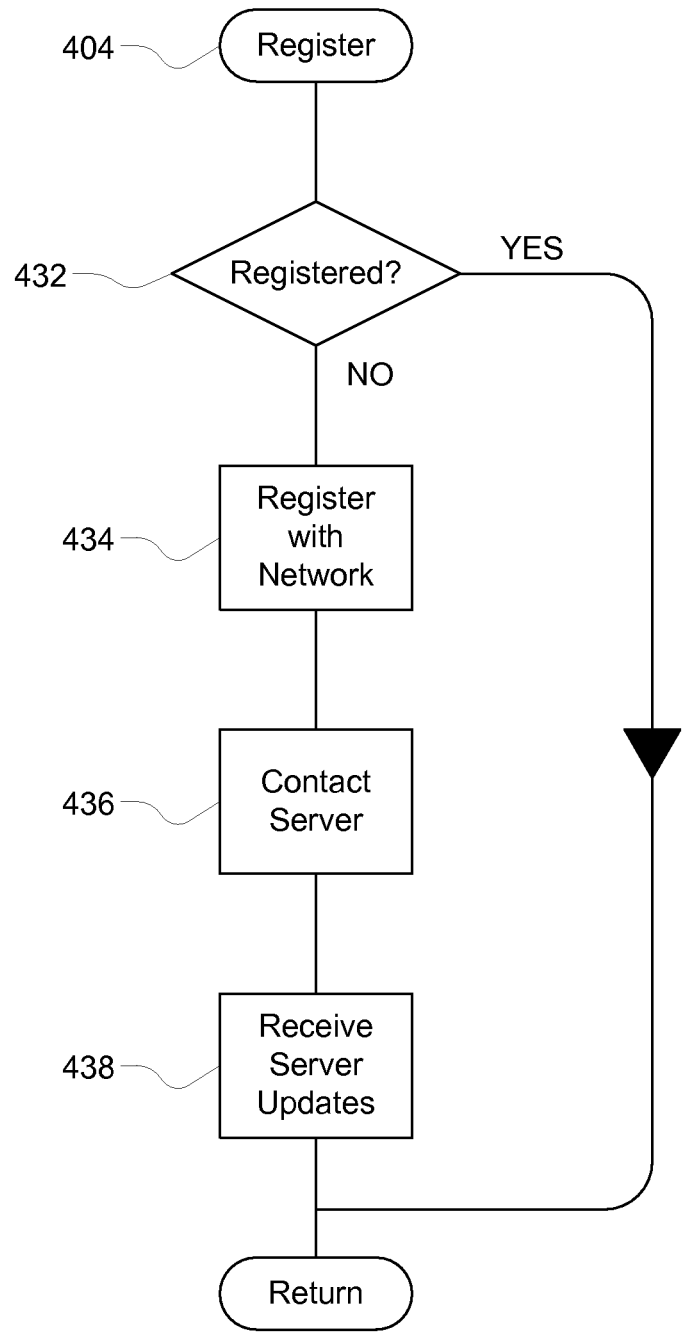
FIG. 13 shows a process flow chart of the register process of FIG. 12.

FIG. 13 shows a process flow chart of the registration process of FIG. 12 that is activated in the preferred embodiment as well as any other embodiments that include a wireless packet data modem. Once registered with a wireless packet data service provider network, wireless packet data modems can remain registered for an indefinite period of time and most such modems, including the wireless packet data modem of the preferred embodiment, periodically query the network to verify that the device is still registered and set an indicator if the registration is dropped. In most instances, this FIG. 13 routine will execute only once upon powering up wireless device 110, and thereafter the indicator check at block 432 will branch to return back to the calling routine of FIG. 12. In case the wireless device is not registered with the network, a registration routine on RF modem 240 will be initiated to register with the network at block 434. Next, at block 436 a query will be transmitted to server 140 indicating that the device is registered, and requesting the server to transmit a copy of configuration table 310 if this has been updated since the last time the wireless device was used. Finally, at step 438 the wireless device will receive and save any configuration table updates received from the server. In alternate embodiments, wireless device 110 may simply log in to the server and retrieve its associated configuration table 310 in a manner well known in the art.

FIG. 14 shows a process flow chart of the get image process routine that is activated from block 412 of the preferred embodiment main process of FIG. 12. This process initially signals digital camera 210 to save a digital image at block 440, may then compresses this image in memory 220 according to a standard compression scheme such as GIF or JPEG at block 442, and for embodiments with interface means 260 which includes a display capable of showing a reduced version of the image, display the image at block 444. Other embodiments may alternately be configured to constantly display the image currently being received by digital camera 210, or in very simple embodiments may be configured only with a viewfinder and have no interface means 260 capable of displaying any image. Still other embodiments may skip the compression stage as it is recognized that larger files generally are more detailed and desirable, and compression to a small size prior to transmission may be less important in the future as greater wireless bandwidth becomes available.

FIG. 15 shows a process flow chart of the audio recording process of FIG. 12 as including first processing step 450 which displays or plays a visual or audible prompt asking the wireless device user to record a voice message. Wireless devices which are equipped to allow audible message recording, including the preferred embodiment, have interface means 260 which includes a record button which must be depressed and held while a message is recorded at block 452. Otherwise the record function could be automatically activated for a set period of time at block 452. After the recording ceases, the message is played back at block 454, and the user is asked at block 456 if the message is acceptable. If the user indicates the message is acceptable, the audio process ends, and if the message is not acceptable processing branches back to block 450 to repeat the message recording process.

Figure 16:
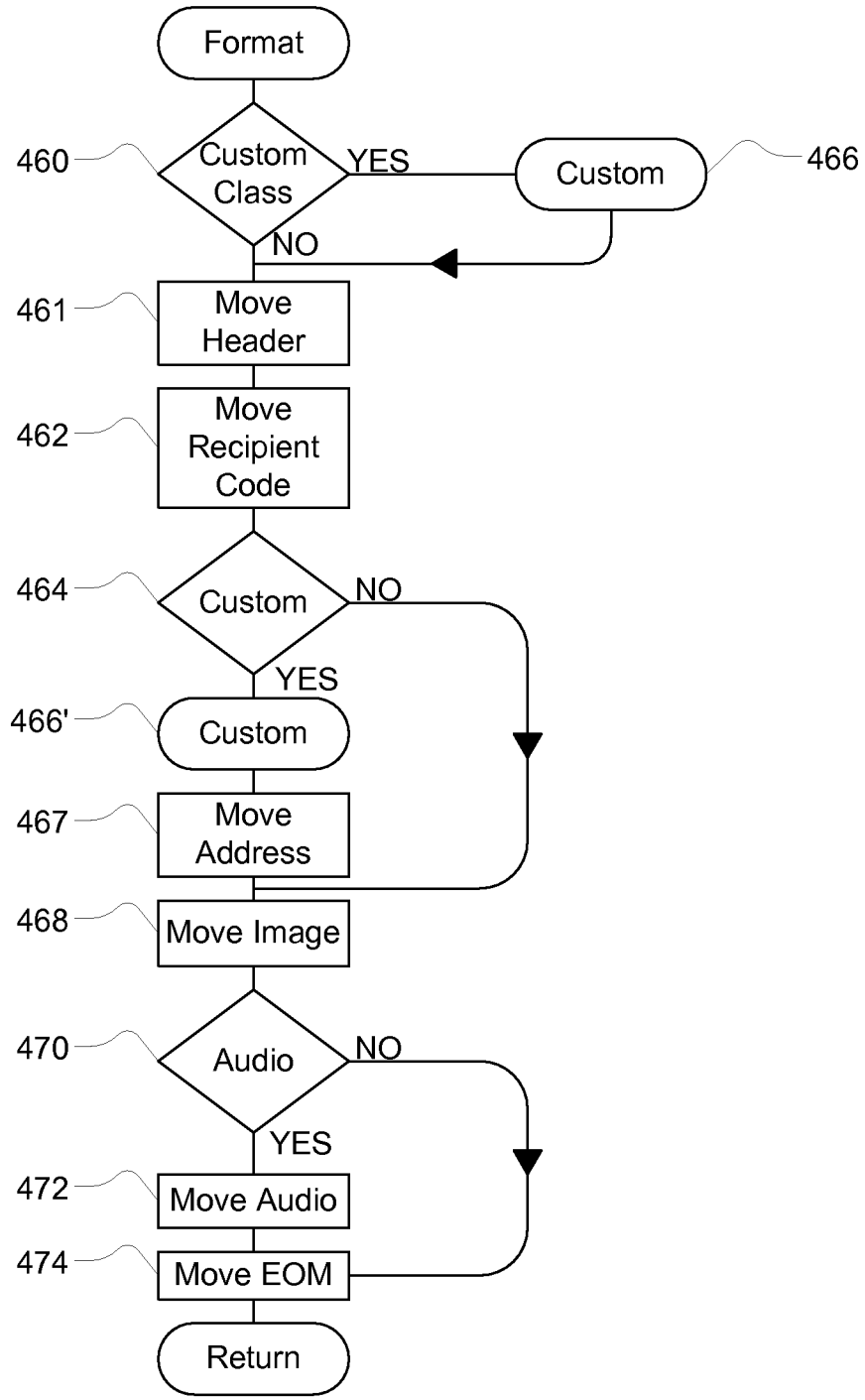
FIG. 16 shows a process flow chart of the format process of FIG. 12.
Figure 19:
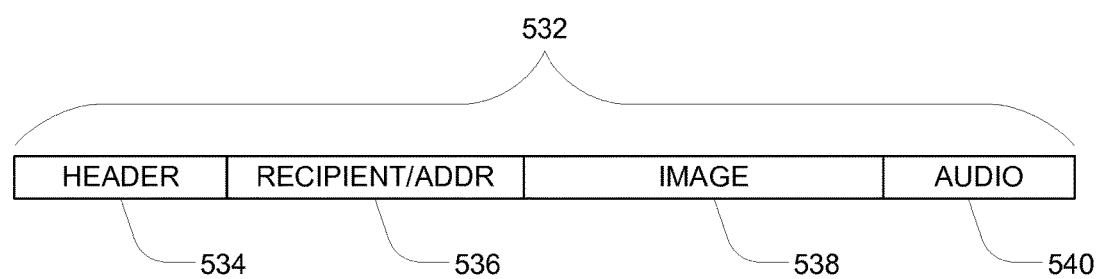
FIG. 19 shows a data format for data transmitted from the wireless camera device to the server of the preferred embodiment.

FIG. 16 shows a process flow chart of the preferred embodiment message format process 418 of FIG. 12 as including first check 460 to determine whether the operation mode is set to include a custom classification. If so, the custom input process is invoked at a first entry block 466 with a parameter indicating that a custom classification is requested, before processing continues at block 461 where the message header is constructed in a buffer area of memory 220. This message header 534, as shown in more detail in FIG. 19, includes such data as the account ID, Classification, date, time, and location coordinates if available. At block 462, currently designated recipient code 536 is moved into the buffer area. At block 464, a check is performed to determine whether a custom recipient code/e-mail address was requested. If so, the custom input process is invoked at a second entry block 466' with a parameter indicating that a custom address is requested, after which the custom address is moved into the buffer area at block 467. Otherwise, processing continues at block 468 where the image is moved into the buffer area. Then, at block 470, a check is performed to determine whether the AUDIO ONLY, SAVE W/AUDIO, or SEND W/AUDIO operation mode is set, indicating that an audio message was recorded. If so, the audio message is moved into the buffer area at block 472. Otherwise, processing continues at block 474 where an end of message indicator is moved into the buffer area. Throughout this process appropriate delimiters will be added to indicate message field boundaries, and a current message length field updated appropriately, in a manner which is well known in the art.

In other embodiments, the message may be formatted by wireless device 110, and account ID and recipient code transmitted to the server, by a different mechanism without departing from the spirit of the invention. For example, an image file may be assigned a unique file name, including the account ID, recipient code, and an image identifier, for later transfer via FTP Put command to server 140. Similarly, audio messages could be sent separately to server 140 under a corresponding file name for later association with the image file by a process on the server.

Figure 17:
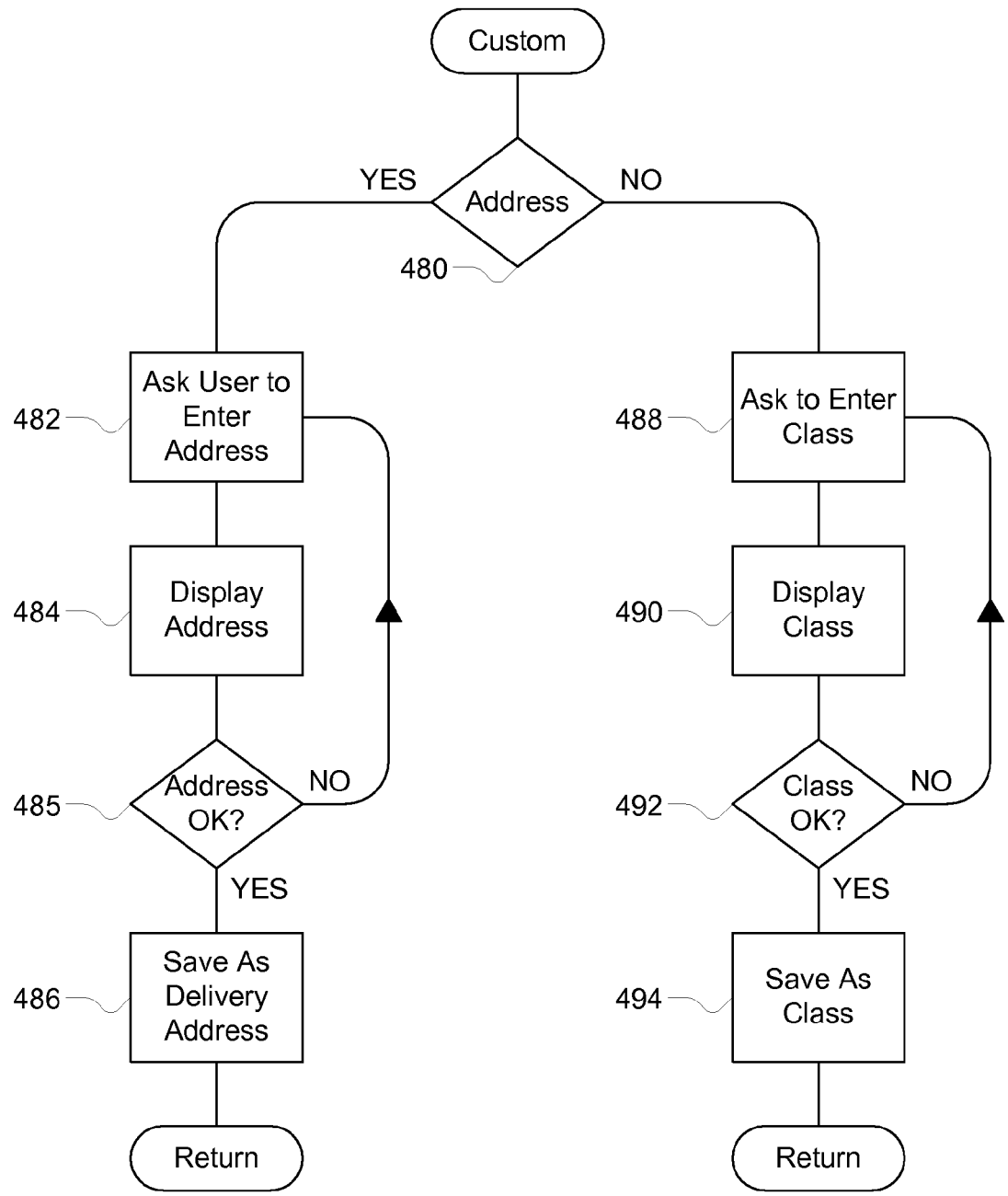
FIG. 17 shows a process flow chart of the custom input process of FIG. 16.

FIG. 17 shows a process flow chart of the preferred embodiment custom input process 466 and 466' of FIG. 16, wherein at block 480, a check is performed to determine whether the routine was activated to provide a custom address or a custom classification. If for a custom address, the user is prompted by the interface means 260 display or by audio prompt to enter the recipient's e-mail address. The address is entered via user interface means 260, via a microphone and voice recognition module on certain embodiments or via other input means such as selections from a scrollable list of alpha numeric characters, or via keyboard input. The address is displayed at block 484 and the user is asked to verify this at block 485. If the address displayed is incorrect, processing branches back to block 482, and, if correct, processing continues at block 486 where the custom address is saved in memory. If the custom input routine of FIG. 17 is entered to provide a custom message classification, then a similar process is executed at blocks 488 through 494 whereby a custom classification is entered and saved in a designated area of memory 220.

In the preferred embodiment a separate processing loop, as shown in FIG. 18, is invoked to transmit messages from the wireless device to the server. This allows users to quickly take several pictures without waiting for the prior picture to be transmitted. A standard wireless packet data routine is utilized to receive messages by RF modem 240 in a manner well known to those of ordinary skill in the art and is not further described here. As previously described in relation to FIG. 12, the transmit process is invoked (if it is not already active) after a message has been formatted in memory 220 for transmission. Upon activation, an indicator on the wireless device is checked to determine whether the transmission is to be accomplished as packet data or as circuit switched data. This indicator may be set to only allow packet or circuit data transmissions, or may be set dynamically in embodiments which include the capability to transmit both as packet data or circuit data depending on the availability of a packet data network, so that one form of transmission may be established as preferred, but if that form is not available, then the other form of transmission will be attempted.

If as circuit switched data, block 512 process is invoked to establish a switched circuit modem connection between the wireless device and either server 140 or a known host which is capable of transmitting the message according to an IP protocol to a defined destination IP address. Formatted messages are stored in memory 220 until transmission is complete, and at block 514 a pointer is established to the first message in queue in memory. At block 516 the message is checked to determine whether the message is on hold, or is marked to be sent, and if marked to be held processing branches to block 526. If not held, a second check regarding packet data is performed at block 518, and if wireless device 110 is set for packet data transmissions a routine at block 520 formats the message for transmission, preferably by the TCP/IP protocol, or by other IP protocols which are well known to those of ordinary skill in the art of packet data transmissions, and activates the RF Modem, which in some embodiments may be preconfigured to transmit the message according to a particular protocol.

If the wireless device 110 is not set for packet data transmissions, then the message is transmitted to server 140 or a known host which is capable of forwarding the message according to an IP protocol to the server. This is preferably accomplished as an asynchronous data transmission in compressed form, such as the V.42bis compression protocol in order to reduce transmission time.

Regardless of the type of transmission, after the transmission is attempted in the preferred embodiment, common processing continues at block 524, and if no error flag was set during transmission, the transmitted message is deleted from memory. However, in other embodiments, the user may wish to maintain a copy of the message after transmission, for back up or other purposes, in which case the message may be marked to be held instead of being deleted at this point. At block 526 the next message slot in the memory queue is pointed to and if another message is in the memory queue processing continues back at block 516. Otherwise, a final check is performed at block 528 to see if a circuit switched data transmission is being used, and if so, the circuit is terminated at block 530.

Figure 20:
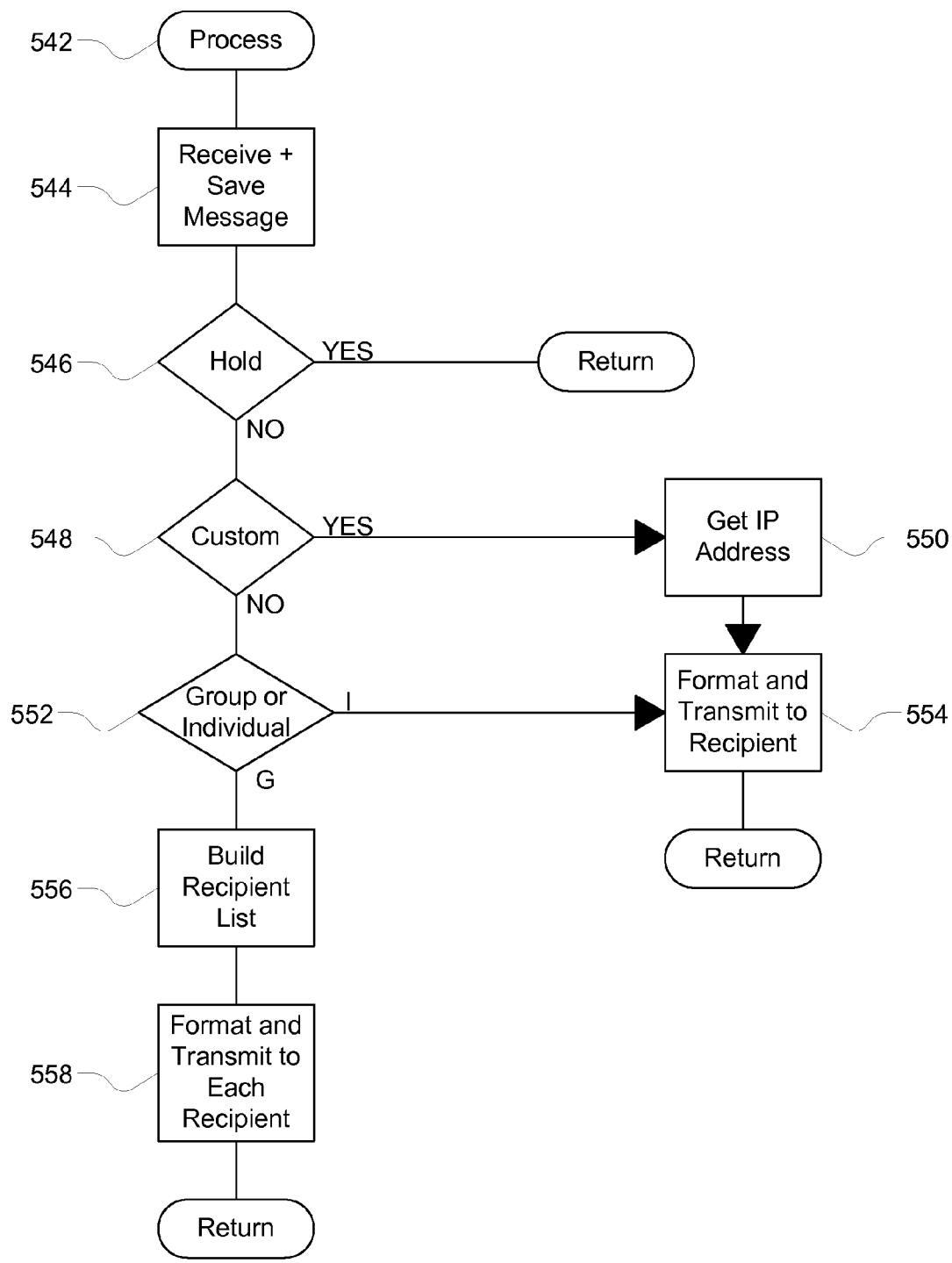
FIG. 20 shows a process flow chart of how the server processes messages received from a wireless camera device.
Figure 21:
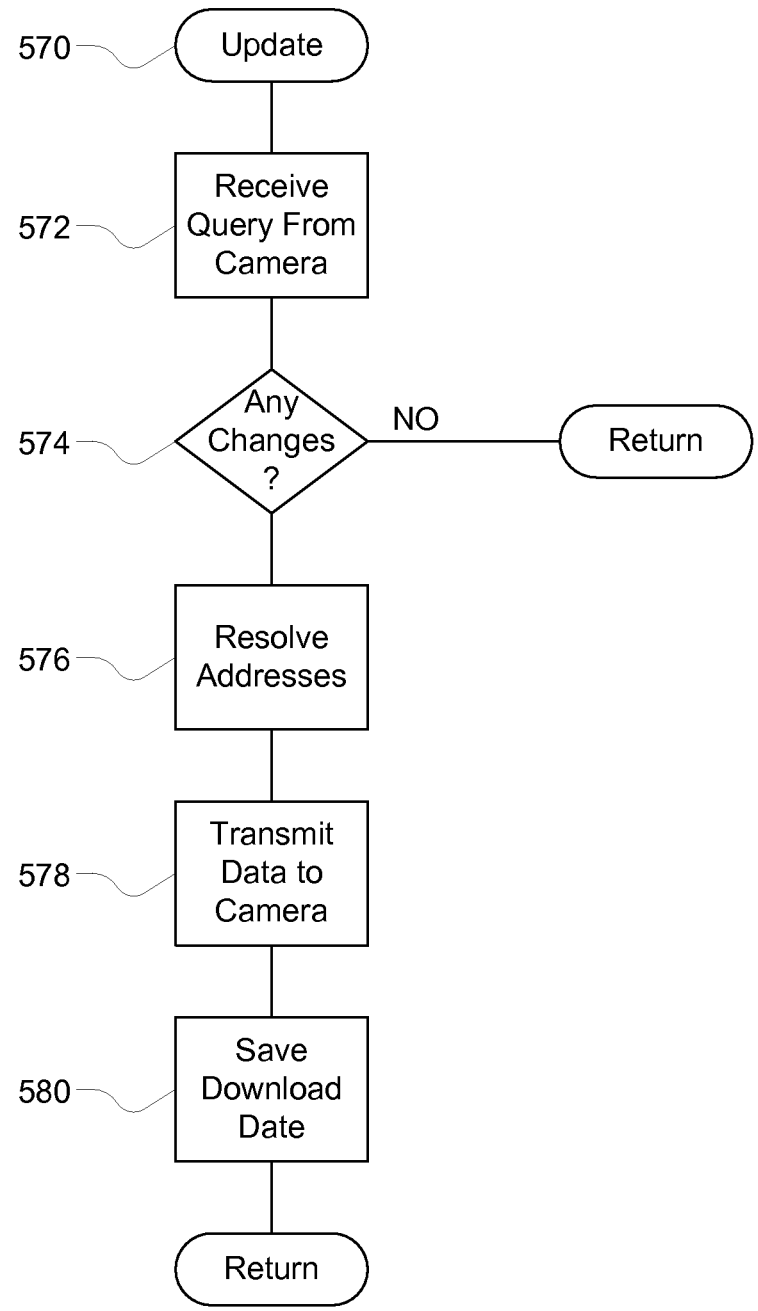
FIG. 21 shows a process flow chart for how the server responds to wireless camera device queries.
Figure 22:
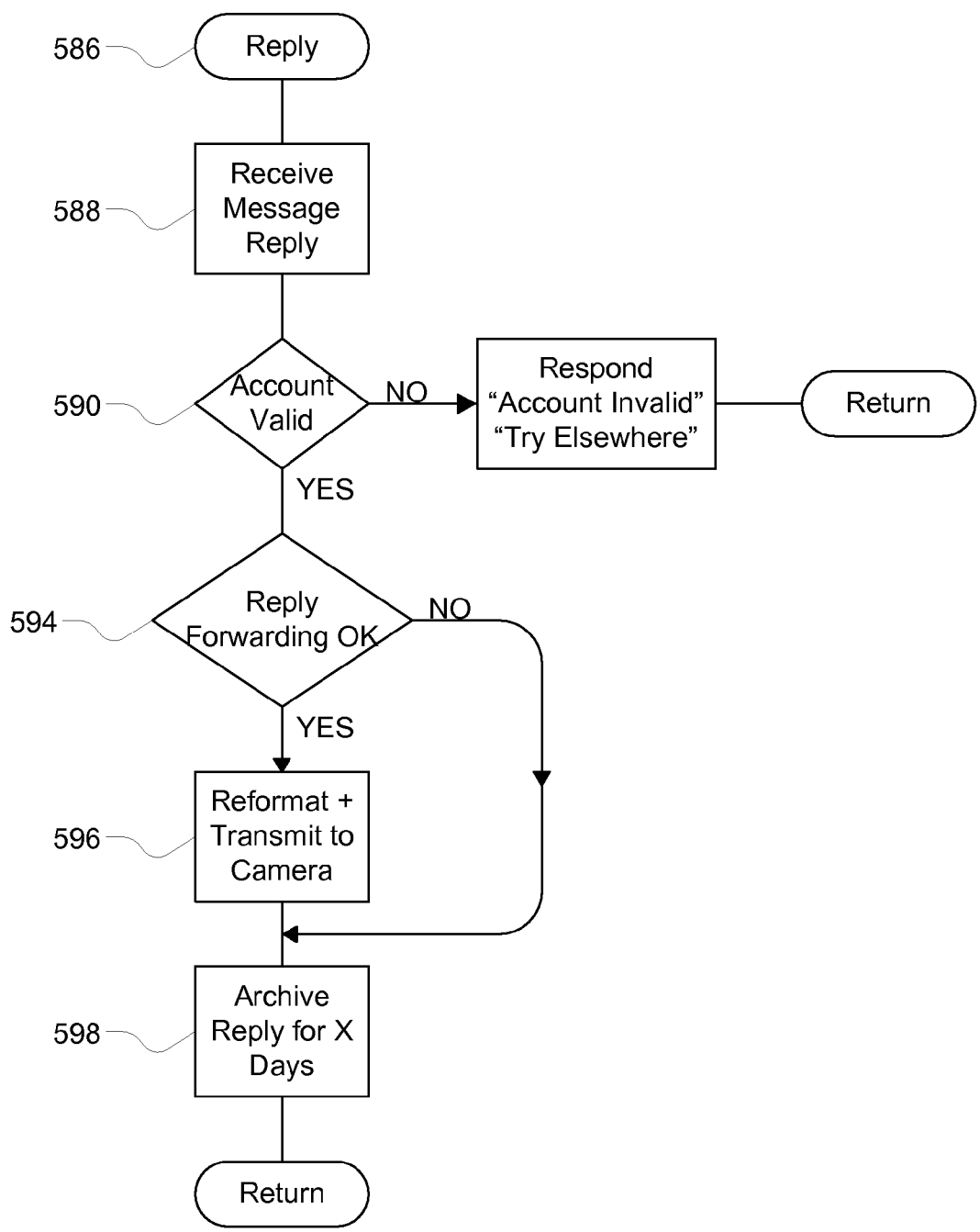
FIG. 22 shows a process flow chart for how the server responds to messages addressed to a wireless camera device.

In addition to the processing routines which drive the server interfaces of FIGS. 7 through 11 and the database calls which are required to support these interfaces, preferred embodiment server 140 includes several specific processes related to message transmissions both from and to wireless camera devices 110, and which are shown in FIGS. 20 through 22. FIG. 20 shows a process flow chart of how the server processes messages received from a wireless camera device. At block 544, the server receives a message, parses out information such as account number, image, audio data, date, time, classification, location, and recipient code which is included in the message, saves this in a server memory for future access and in a holding area designated for this account, and if a path is associated with the recipient code saves the message at that location. At block 546, the server determines whether the message is to be held or if the account is no longer valid, in which case no further action is taken, and the message will be marked for deletion after a predetermined period of time absent further action. At block 548, if a custom address was included in the message, then processing branches to block 550, where the address may be resolved into an IP address before being formatted as a standard e-mail message and transmitted to the recipient or this may be handled automatically by a commercially available e-mail program such as MS Outlook, depending on how the server is configured. Otherwise, if the message is to an individual then processing continues directly at block 554. If the message is to a group, then a list of recipient addresses is retrieved at block 556, and at block 558 the message is formatted as a standard e-mail message and transmitted to each recipient. Some embodiments may only send out a thumbnail version of images and/or a hyperlink to the server path or URL where the message has been saved.

Certain embodiments may allow delivery of the audio portion of messages to a recipient's phone number, in which case a separate server process would be invoked to make a set number of attempts to deliver the message to the listed phone number or a voice mail system at that number, after which the message would be marked undelivered. If the message recipient wished, they could leave a reply message immediately, via an interactive voice process on the server, which reply the server would later attempt to deliver, or the recipient could call back later to a designated number and enter a response ID number, both as specified with the original message delivery, in order to leave a reply message.

FIG. 21 shows a process flow chart for how preferred embodiment server 140 responds to queries from wireless camera device 110 in order to download the current account configuration table to the wireless device. At block 572, the server receives a query from the wireless device as previously discussed in relation to FIG. 13. If there have been any changes to the account since the last download, then processing continues from block 574 to block 576 where the server contacts a domain server in order to resolve all individual IP addresses for e-mail addresses associated with account individuals' e-mail addresses. At block 578, the updated configuration table is transmitted to the camera in a prescribed format, and the last download data is updated for the account. In other embodiments, wireless device 110 may simply log into server 140 upon initial activation of the wireless device and registration with the wireless packet data network and retrieve its associated configuration table, as by an FTP Get command.

FIG. 22 shows a process flow chart for how the server responds to messages received by server 140 and addressed to an address associated with wireless camera device 110. The message is typically received at block 588 as an e-mail message, but as previously discussed may comprise a voice mail message. If the account is valid, then processing will continue at block 594; otherwise the server will attempt to respond that the account is no longer valid. As discussed previously in relation to FIG. 9, the account data is checked at block 594 to determine whether a reply from this source is authorized. If a reply is authorized, the message is reformatted in a form which will be recognized by the wireless device, and transmitted to the camera ID at block 596. In either case, in the preferred system the reply is archived for a predetermined number of days before being deleted, and will be accessible for review prior to deletion via Internet account access or via other means, such as for example embodiments where server 140 and wireless device 110 are configured respectively as server and client using the IMAP protocol as previously discussed.

Use and operation of the preferred embodiment of the present invention may be better understood by reference to the figures in connection with the following description. The wireless device user will obtain wireless device 110 and register it with a wireless packet data network service provider, who will assign camera id 326, or dial id 327, account validity dates 328 and 329, initialize the RF modem to recognize the appropriate id, and arrange for initialization of account information 320 (FIG. 7) on server 140. The user will then be able to logon to the server and initialize preferred address book entry details as shown in FIGS. 8-11, or this information may be provided directly to a service provider who will initialize the address book on behalf of the user. Alternately, and in cases where the user does not own a wireless device but only rents one on occasion, the user may establish an account and initialize address book details at his or her convenience prior to obtaining a wireless device, and the wireless device provider will associate a particular device with this account information when the user picks up the device. Next, the user can activate wireless device 110, which will automatically initiate the process of FIG. 12 to register the wireless device with the packet data network and download updates as previously described in relation to FIGS. 13 and 21. After the configuration table is initialized on the wireless device, the user will be able to operate wireless device 110 interface in order to select a recipient code, mode, and classification, as described in relation to FIGS. 4-6. If this step is skipped, the default values for any transmitted messages will be respectively set for HOLD, SEND, and NONE. The user will then be able to activate the camera by pressing send key 196, which will activate processing of FIG. 12 subsequent to block 406 in order to capture an image and transmit it as part of a message to server 140 for processing and distribution according to the selected recipient code as described in relation to FIG. 20.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A digital photo processing system comprising:

at least one wireless digital camera apparatus, wherein the at least one wireless digital camera apparatus includes a processor, a memory, a destination address and one or more previously defined recipient codes stored in the memory, a user interface connected to the processor for displaying the one or more previously defined recipient codes and receiving signals indicating user selection of a displayed one or more previously defined recipient codes, a digital camera connected to the processor for capturing one or more digital images in response to the signals from the user interface, a radio frequency (RF) communications device connected to the processor, wherein the processor is configured to respond to signals received from the user interface to transmit a message including the one or more previously defined recipient codes and the one or more digital images to the destination address via the RF communications device; and a server associated with the destination address and responsive to the message received at the destination address from the at least one wireless digital camera apparatus, and server memory configured to store account configuration data including recipient code data, wherein the server is further configured to parse the one or more previously defined recipient codes from the message and process the message according to the account configuration data associated with the one or more previously defined recipient codes, and to transmit the account configuration data including the one or more previously defined recipient codes to the at least one wireless digital camera apparatus, wherein the processor of the at least one wireless digital camera apparatus is configured to be responsive to receiving the account configuration data transmitted from the server to update the memory of the at least one wireless digital camera apparatus with at least a portion of the account configuration data.

2. A digital photo processing system comprising:

at least one wireless digital camera apparatus, wherein the at least one wireless digital camera apparatus includes a processor, a memory, a destination address and one or more previously defined recipient codes stored in the memory, a user interface connected to the processor for displaying the one or more previously defined recipient codes and receiving signals indicating user selection of a displayed recipient code, a digital camera connected to the processor for capturing one or more digital images in response to the signals from the user interface, a radio frequency (RF) communications device connected to the processor, wherein the processor is responsive to the signals received from the user interface, to transmit a message, including the one or more previously defined recipient codes and the one or more digital images to the destination address via the RF communications device;

a server associated with the destination address and responsive to the message received at the destination address from the at least one wireless digital camera apparatus;

a database storing account configuration data including recipient code data; and a server communication device, wherein the server is configured or otherwise operable to parse the one or more previously defined recipient codes from the message, retrieving from the database account configuration data that is associated with the one or more previously defined recipient codes, and processing the message according to the account configuration data.

3. The digital photo processing system of claim 2, wherein the server is further configured to archive the message on the server.

4. The digital photo processing system of claim 2, wherein the server is configured to distribute the message to one or more recipient addresses associated with the one or more previously defined recipient codes included in the account configuration data.

5. The digital photo processing system of claim 2, wherein the message further comprises an account identifier, the database account configuration data includes an account identifier, and the server is configured to retrieve from the database account configuration data, data that is associated with both the account identifier of the message or the account identifier of the database account configuration data and the one or more previously defined recipient codes.

* * * * *